United States Patent
Hodson (10) Patent No.: US 7,945,682 B2
(45) Date of Patent: May 17, 2011

(54) METHOD FOR OPTIMIZING A LINK SCHEDULE

(75) Inventor: William R. Hodson, Telford, PA (US)

(73) Assignee: Honeywell International Inc., Morristown, NJ (US)

( * ) Notice: Subject to any disclaimer, the term of this patent is extended or adjusted under 35 U.S.C. 154(b) by 485 days.

(21) Appl. No.: 12/074,662

(22) Filed: Mar. 5, 2008

(65) Prior Publication Data

US 2008/0229317 A1 Sep. 18, 2008

Related U.S. Application Data

(63) Continuation of application No. 10/283,766, filed on Oct. 29, 2002, now Pat. No. 7,363,380.

(51) Int. Cl.
*G06F 15/16* (2006.01)

(52) U.S. Cl. ............ 709/228; 709/229; 709/253; 700/1; 700/23; 700/83; 700/7; 700/28; 700/44; 702/188; 702/182

(58) Field of Classification Search .................. 709/228, 709/229, 253; 700/1, 23, 83, 7, 28, 44; 702/188, 702/182
See application file for complete search history.

(56) References Cited

U.S. PATENT DOCUMENTS

| | | |
|---|---|---|
| 5,768,119 A | 6/1998 | Havekost et al. |
| 5,854,890 A | 12/1998 | Ramachandran et al. |
| 5,970,430 A | 10/1999 | Burns et al. |
| 5,971,581 A | 10/1999 | Gretta et al. |
| 5,978,850 A | 11/1999 | Ramachandran et al. |
| 5,995,916 A * | 11/1999 | Nixon et al. ................. 702/182 |
| 6,014,612 A | 1/2000 | Larson et al. |
| 6,044,305 A | 3/2000 | Larson et al. |
| 6,047,222 A * | 4/2000 | Burns et al. ..................... 700/79 |
| 6,076,952 A * | 6/2000 | Gretta et al. ................... 700/83 |
| 6,088,665 A | 7/2000 | Burns et al. |
| 6,141,596 A | 10/2000 | Gretta et al. |
| 6,192,281 B1 * | 2/2001 | Brown et al. ..................... 700/2 |
| 6,285,966 B1 | 9/2001 | Brown et al. |
| 6,298,454 B1 | 10/2001 | Schleiss et al. |
| 6,377,859 B1 | 4/2002 | Brown et al. |
| 6,424,872 B1 * | 7/2002 | Glanzer et al. ................. 700/18 |
| 6,594,530 B1 | 7/2003 | Glanzer et al. |
| 6,618,745 B2 | 9/2003 | Christensen et al. |
| 6,633,782 B1 * | 10/2003 | Schleiss et al. ................ 700/26 |
| 6,721,609 B1 | 4/2004 | Wojsznis et al. |
| 6,738,388 B1 | 5/2004 | Stevenson et al. |
| 6,915,364 B1 | 7/2005 | Christensen et al. |
| 6,944,681 B1 | 9/2005 | Christensen et al. |
| 6,947,389 B1 * | 9/2005 | Chen et al. .................... 370/252 |
| 6,978,186 B2 * | 12/2005 | Kirstein .......................... 700/17 |
| 7,062,580 B2 * | 6/2006 | Donaires ....................... 710/104 |
| 7,069,580 B1 * | 6/2006 | Deitz et al. ......................... 726/2 |
| 7,146,230 B2 * | 12/2006 | Glanzer et al. ................. 700/83 |
| 7,200,448 B2 * | 4/2007 | Cachat et al. ................... 700/18 |

* cited by examiner

*Primary Examiner* — Dohm Chankong
(74) *Attorney, Agent, or Firm* — Munck Carter, LLP

(57) ABSTRACT

A method for improving a link schedule used in a communications network is disclosed. While the method applies generally to networks that operate on a scheduled communications basis, it is described in the context of a Foundation FIELDBUS. The method includes: scheduling sequences and their associated publications according to their relative priority, per application; minimizing delays between certain function blocks, and between certain function blocks and publications; and grouping certain publications. Accordingly, advantages such as latency reduction, schedule length reduction, and improved communications capacity are gained.

20 Claims, 7 Drawing Sheets

Dotted lines indicate function blocks within a single device.

METHOD FOR OPTIMIZING A LINK SCHEDULE

This application is a continuation of prior U.S. patent application Ser. No. 10/283,766 filed on Oct. 29, 2002, which is now U.S. Pat. No. 7,363,380.

BACKGROUND OF THE INVENTION

1. Field of the Invention

The invention relates generally to communications networks and more particularly to communications networks that operate on a periodically executed schedule.

2. Discussion of the Related Art

FOUNDATION™ FIELDBUS technology is an open technology provided by the FIELDBUS Foundation of Austin, Tex., USA. It is a local area network type of communications BUS based on the International Electro-Technical Commission 61158 FIELDBUS standard. That standard calls for some of the periodic communications on the BUS to be scheduled within a periodically executed schedule.

While Foundation FIELDBUS technology permits interactive communication among devices, scheduling is restricted to some degree. For instance, only one function block in a single application processor device may execute at a time. Further, only one device may publish (that is, a publication or back-calculation publication) on the link at a time, and client-server activity may only take place between publications.

Function blocks are typically scheduled in "natural order", from input to output, following primary connections. Particularly when many devices are sharing a link, "natural order" scheduling tends to produce a large number of relatively "short" publication gaps. These "short" gaps often reflect wasted bandwidth because large queued communications, and all communications queued behind them, are delayed until a large enough gap arises in the schedule. For example, display call-ups and operator station display call-ups are often most severely affected since they typically require relatively large gaps to satisfy their heavy information transfer demands. Accordingly, the number of client-server messages transmitted per macrocycle is limited, and less than optimum application performance is achieved.

"Natural order" scheduling also often yields relatively long schedules and frequently produces significant loop latencies. Since large latencies reflect older samplings and ineffectual performance, their appearance in critical control applications is often a matter of great concern.

Thus, an improved method for scheduling is needed. Such a method should allow for greater communications usage from a fixed bandwidth; shorten the overall scheduled portion of the link schedule; and, minimize loop latencies to achieve better control.

SUMMARY OF THE INVENTION

It is an object of the present invention, at least in the preferred embodiment, to overcome or substantially ameliorate one or more of the disadvantages of the prior art, or to provide a useful alternative.

It is also an object of the present invention to set forth a method for optimizing a mixed scheduled/unscheduled network schedule (a mixed network being one in which some of the bandwidth is scheduled and some of the bandwidth is unscheduled), including a FIELDBUS and, particularly, a Foundation FIELDBUS. For example, by prioritizing the scheduling of sequences of function blocks and their associated publications, and by minimizing certain delays during the scheduling process, the invention's methodology produces a link schedule that reduces loop latencies.

The present invention, therefore, provides a method of creating a schedule for a network that communicates in accordance to a periodically executed schedule, which includes the steps of first identifying a plurality of function blocks requiring execution and then identifying each of the function blocks as members of one or more groups. Next, the groups are prioritized such that each group has a priority relative to the other group, and then each of the groups containing at least one unscheduled function block is scheduled, one group at a time, in an order based on the priority of each group for communication on the network.

By scheduling certain function blocks, in different devices, such that their respective schedule times at least partially overlap, the present invention reduces the scheduled portion of the link schedule (that is, for example, as compared with "natural scheduling"). Consequently, more activities can be accommodated and the macrocyle may be shortened.

Under the invention's methodology, publications are also grouped in order to eliminate potential publication gaps. Alternatively, since larger gaps have a greater potential of permitting longer unscheduled messages to be issued, a publication may be positioned between two other publications so that the two publication gaps formed provide a very large and a very small gap. For instance, since back-calculation publications do not have critical timing requirements, they can often be scheduled to execute immediately before or after back-calculation publications and non-back-calculation publications. In this way, less bandwidth is wasted and application performance is increased.

Finally, it is important to note that although the ideas in this document are explained in the context of a single application processor device, the methodology is also applicable to multi-processor devices. In the multi-processor context, more than one function block in a device may execute at one time. On the other hand, multi-processor devices would still be treated as "single" devices with respect to the above-stated limitation on concurrent, or partially concurrent, publications.

BRIEF DESCRIPTION OF THE SEVERAL VIEWS OF THE DRAWINGS

Other objects, features, and advantages of the present invention will be apparent from the following description of a preferred embodiment thereof, taken in conjunction with the sheets of drawings, in which.

DETAILED DESCRIPTION OF THE INVENTION

Definitions

The following terms, grouped by general category for convenience, are used throughout the document with the meanings defined as follows:

a. Latency

Loop Latency The time that elapses between the input function block's process sampling until the control element is commanded to correct a deviation by the output function block.

Critical Loop Latency: The time that elapses in the highest priority loop between the input function block's process sampling until the control element is commanded to correct a deviation by the output function block.

Latency Factor Ratio of "optimized" Critical Loop Latencies to "natural" Critical Loop Latencies.

Latency Improvement: 100% minus the Latency Factor, expressed as a percentage.

b. Publication

Publication: a message, often scheduled, made available on a network to one or more nodes at the same time.

Non-Back-Calculation Publication: a publication that is not associated with back-calculation information.

Back-Calculation Publication: a publication which is associated with back-calculation information, usually used on a subsequent execution cycle by a previously executed block to initialize, prevent reset windup, and provide status information.

Publication Gap: Time between the end of one publication and the start of the next scheduled publication.

Extra Time Associated With Any Communication (or "Associated Time"): An estimate average length of time lost with any message. This may include, for example, the time attributed to access delays, average time lost due to a next-queued message that exceeds available time, conflicts with "housekeeping" activities such as passing tokens, probing nodes, distributing time, etc. It is assumed that the Associated Time is 15 ms in the examples in this document.

Usable Publication Gap (or Usable Gap): The portion of the publication gap available for messages other than publications or back-calculation publications. When the publication gap is equal to or greater than the "Minimum Time Needed For Any Communication", the Usable Gap is calculated by subtracting the "Associated Time" from the "Publication Gap". This definition is based on the assumption that the shortest non-scheduled transaction takes approximately 15 milliseconds and that the "extra time associated with any communication" is assumed to be about 15 milliseconds, and a publication gap becomes usable when it is greater than 30 milliseconds. Accordingly, the "Minimum Time Needed For Any Communication" is 30 milliseconds in the examples in this document.

Minimum Time Needed For Unscheduled Communication (or "Minimum Time"): The minimum length of time that unscheduled communication on the link, including client/server interaction, requires in order to fully execute. It is assumed that the Minimum Time Needed For Any Communication is greater than 30 ms for the examples in this document.

Publication Gap Factor: Ratio of the usable gaps of the natural macrocycle to the usable gaps of the optimized macrocycle.

Publication Improvement: 100% minus the Publication Gap Factor, expressed as a percentage.

c. Macrocycle

Macrocycle Utilization Factor: Ratio of the of the optimized macrocycle time to the natural macrocycle time, expressed as a percentage.

Macrocycle Improvement: 100% minus the Macrocycle Utilization Factor, expressed as a percentage.

Natural Macrocycle The macrocycle created by arranging function block executions in the order of input to output, following primary connections, with each publication occurring immediately after execution of the function block that calculates it.

d. Function Blocks/Sequences

Function Block (or Block): An object that has inputs and/or outputs that may be interconnected to or from other function blocks and executes an algorithm on its inputs to produce its outputs.

Input Function Block (or Input Class Function Block): A function block that usually originates with a value derived from a process (e.g., AI, DI, PI). The term "usually" is employed because in most cases, the input block is at the beginning of the string of blocks. There are, however, obscure cases that someone skilled in the art would recognize.

Output Function Block (or Output Class Function Block): A function block that usually terminates with a value provided to a process (e.g., AO, DO, CAO, CDO). The term "usually" is employed because in most cases, the output block is at the end of the string of blocks. However, it is possible to take the output value and connect it to another block to do auxiliary calculations or even to loop it back as a simulated plant value for demonstration or test purposes. These are obscure uses that someone skilled in the art would recognize.

Control Function Block: A function block whose primary function is to compare a process-influenced value to a setpoint, or target value, and provide one or more outputs that are somehow directed to control the process to the setpoint, or target value, usually through an output function block.

Function Block Sequence (or Sequence or Sequence of Function Blocks): A "sequence" in this document is defined as a series of function blocks wherein the term sequence is defined as:
(a) a group of function blocks wherein one input associated with each function block—except the function block beginning the sequence—is dependent on an output of an immediately preceding function block; and
(b) a single function block that does not input another block's output, or output another block's input.

Control Loop Sequence: A Sequence of Function Blocks that starts with an input block and ends with an output block.

Monitoring Sequence: A sequence of one or more Function Blocks that starts with an input block and does not contain a control block or an output block. Accordingly, a "Monitoring Sequence" is any sequence that is not a Control Loop Sequence or a Cascade Loop Sequence.

Primary Connection Input: A "Primary Input", "Process Variable", or "Cascade Input" as defined by the formal models of the FOUNDATION FIELDBUS Function Block Application Process Specifications and as designated by the authors of each type of block or as otherwise designated by a user for a particular application.

Primary Connection Output: A "Primary Output" as defined by the formal models of the FOUNDATION FIELDBUS Function Block Application Process Specifications and as designated by the authors of each type of block or as otherwise designated by a user for a particular application. For example, OUT, OUT_D, etc.

Primary Connection: A reference by a "Primary Connection Input" to a "Primary Connection Output", as defined by the formal models of the FOUNDATION FIELDBUS Function Block Application Process Specifications or as otherwise designated by a user for a particular application.

e. Cascades

Cascade Loop Sequence: A Sequence of Function Blocks that starts with an input block and ends with a control function block, the control function block in turn providing an output (directly or indirectly) to a block in a downstream control loop sequence.

Setpoint (or Control Target): The value that a downstream, or inner, control block uses as a target for the primary process variable it also receives. An upstream, or outer, cascade loop sequence's control function block provides a setpoint to a downstream, or inner, cascade loop sequence's control function block.

Downstream: Refers to a function block or sequence of function blocks whose input is provided by an output of the referenced function block.

Upstream: Refers to a function block or sequence of function blocks whose output is provided to an input of a referencing function block.

Inner Control Loop: A control loop sequence or cascade loop sequence that is provided a setpoint (control target) by another sequence. Inner control loops are downstream relative to outer control loops.

Outer Control Loop: A control loop sequence or cascade loop sequence that provides a setpoint (control target) to another sequence. Outer control loops are upstream relative to inner control loops.

f. Sample-Skew/No-Sample-Skew

Sample-Skew: A time difference between the sampling times of set of multiple inputs (or samples). When a group of input function blocks are used together, as in a calculation involving each (e.g., average of several sampling locations or mass flow involving temperature, pressure, and differential pressure) or as in a comparison (minimum, maximum, median) of several sampling locations, the times of each of the samplings relative to each other may or may not be important to the application. "Sample-Skew" indicates that relative times of each sampling are not important to the application.

No-Sample-Skew: No time difference between the sampling times of set of multiple inputs (or samples). When a group of input function blocks are used together, as in a calculation involving each (e.g., average of several sampling locations or mass flow involving temperature, pressure, and differential pressure) or as in a comparison (minimum, maximum, median) of several sampling locations, the times of each of the samplings relative to each other may or may not be important to the application. "No-Sample-Skew" indicates that relative times of each sampling are important to the application.

ABBREVIATIONS

The following abbreviations are used throughout the document with the meanings defined as follows:

AI—Analog Input Function Block
Arith—Arithmetic Calculation Function Block
AO—Analog Output Function Block
CAO—Complex Analog Output Function Block
DI—Discrete Input Function Block
DO—Discrete Output Function Block
CDO—Complex Discrete Output Function Block
PI—Pulse Input Function Block
Integrator—Integrator Function Block
ISel—Input-Selector Function Block
PID—Proportional-Integral-Derivative Control Function
SP (CAS_IN)—Set Point input.
PV (IN)—Process or Primary Variable (or Value) Input.

Operation of the Preferred Embodiments

While the steps and sub-steps described below are in a sequential order, it will be apparent to those skilled in the art that it is possible for the steps and sub-steps to be performed in alternative sequences.

1. Identify Function Block Sequences

In order to begin the scheduling process, certain groups of function blocks must be identified. Preferably, those groups are "sequences" of function blocks. However, it will be apparent to those skilled in the art that there are numerous other "groups", other than "sequences", that could be identified in alternate embodiments.

Further, while the method for identifying sequences presented above is the preferred method, sequences, or other groups of function blocks, may be identified in numerous, less preferable ways that will be apparent to one skilled in the art. Moreover, each individual block could be considered a separate group in alternative embodiments.

1.1 Create each sequence, preferably one sequence at a time, by starting at each input class function block and following each primary connection from the input class function block's primary connection output to the output's use by a subsequent "referencing" block (through the "referencing" block's primary connection input, such as IN, IN_D, PV, PV_D, CAS_IN, CAS_IN_D, SEL_n, etc.). If there is no reference to a primary connection output, consider the single block—whether it is an input class function block, a block via Section 1.4, etc.—a sequence.

1.1.1 If the referencing block has already been included in this sequence, do not include the referencing block, as it would form an unwanted circular reference.

1.1.2 If the referencing block's input connection is a cascade setpoint connection of a control block, other than a Control Selector block or an Output Splitter block (or the like), terminate the sequence without including the referencing block because it will be included in another control loop sequence.

1.1.3 If more than one primary connection exists out of the input block, consider and evaluate each as a "separate" sequence according to Section 1.1, preferably after this sequence is identified completely.

1.2 Then, follow each primary connection from the "old referencing" block's primary connection output to the output's use by a "new referencing" block. However, the output of output class blocks should not be followed.

Accordingly, if this subsection is arrived directly from Section 1.1, the "old referencing" block is the input class function block. On the other hand, if this subsection is arrived directly from Section 1.3, then the "new referencing" block essentially becomes the "old referencing" block.

1.2.1 Do not include the referencing block because it would form an unwanted circular reference if the new referencing block has already been included in this sequence.

1.2.2 If the "new referencing" block's input connection is a cascade setpoint connection of a control block, other than a Control Selector block or an Output Splitter block (or the like), terminate the sequence without including the new referencing block since it will be included in another control loop sequence.

1.2.3 If more than one primary connection exists out of the "old referencing" block, i.e., the new "referenced" block, consider and evaluate each as a separate sequence according to Section 1.1 after this sequence is identified completely.

1.3 Repeat step 1.2 until there is no reference to a primary connection output.

1.4 If there are any function blocks remaining that have not been identified in a sequence per the above rules: find each one that does not have an input connection; start a new function block sequence as with step 1.1; and, process as per rules 1.1 through 1.3 above, treating it as if it were an input class function block.

For example, although most function block sequences start with an input class block, a manually-controlled output class block or function block sequence used for a specialized purpose, such as a demonstration or a test, could have a sequence starting with a non-input-class block.

1.5 After evaluating 1.4, if there are still any function blocks remaining that have not been identified in a sequence per the above rules, choose any one of the remaining blocks and start a new function block sequence as with step 1.1. Process as per rules 1.1 through 1.3 above, treating the block as if it was an input class function block. Accordingly, Section 1.5 is primarily, but not exclusively, intended to address circular function block references.

1.6 Repeat 1.5 until no blocks remain that have not been identified as part of a function block sequence.

For example, although most function block sequences start with an input class block or a block with no input connections, a sequence could theoretically be composed of a series of blocks that form a loop, such that every block in the sequence has an input connection.

2. Prioritize Function Block Sequences

Next, the sequences are prioritized. In the preferred embodiment, the sequences are prioritized according to both period type and period length.

2.1 Sequences involved in control are higher priority than all sequences not involved in control. For example, Control Loop Sequences and Cascade Loop Sequences are higher priority than Monitoring Sequences.

2.2 Within each of the classifications involved in control (e.g., Control Loop Sequences and Cascade Loop Sequences) and those not involved in control (e.g., Monitoring Sequences), function block sequences that execute faster (i.e., those having shorter periods) are higher priority than those that execute slower (i.e., those having longer periods).

2.3 When a Control Sequence and a Cascade Sequence have identical period lengths, Control Loop Sequences have higher priority than Cascade Loop Sequences. This is because the Control Sequences are in direct control, whereas the Cascade Sequences control indirectly by providing a setpoint to a downstream Control Loop Sequence or another Cascade Loop Sequence.

2.4 For those function block sequences of equal priority based on 2.1 to 2.3 (for example, two Cascade Sequences both having two second periods), those whose unscheduled blocks and publications require larger contributions to the link schedule (i.e., function block execution times plus associated publication times) are higher priority than those that provide shorter contributions. The rationale underlying this "tie-breaking" provision is that sequences with larger contributions are more likely to have a greater number of scheduling conflicts.

Other embodiments use type alone; period length alone; the implementer's discretion; and/or any factor or combination of factors relevant to sequences, function blocks, and/or scheduling to break "ties". Such other methods are numerous and readily apparent to those skilled in the art.

3. Create the Link Schedule

Next, the sequences are scheduled by assigning block executions and publications to the link schedule, based on priorities as set forth below. The schedule is preferably normalized after the sequences are scheduled, but alternative embodiments may perform normalizing at other times.

3.1 Preferably, the macrocycle length (i.e., the time duration) is determined before scheduling. The length is preferably the least common multiple of contributing function block's periods. However, this may be performed at other times, and such options will readily be known to those skilled in the art.

3.2 Add non-back-calculation elements related to sequences (i.e., function blocks and non-back-calculation publications) to the link schedule one at a time, starting with the highest priority function block sequence remaining, continuing until all sequences are assigned. Accordingly, each of the "not yet scheduled" elements associated with every block in a function block sequence is assigned before starting to assign the "not yet scheduled" elements associated with the blocks of the next highest priority function block sequence. In this way, each block and each required block publication are assigned only once.

"Publication", as employed in Section 3.2, means non-back-calculation publication. Further, all scheduling in Section 3 is subject to the following provisos:

3.2(A) The schedule execution time of any two blocks within any given device may not overlap.

3.2(B) The schedule time of any two publications may not overlap.

In addition, publication and block executions are preferably scheduled to minimize delays between:

3.2(C) A function block execution that produces an output that does not require a publication and a function block execution that directly inputs such output.

3.2(D) An execution of a publication-producing block, and the publication produced by that publication-producing block.

3.2(E) A function block execution that inputs a publication, and the publication input by the publication-inputting block.

3.2.1 The first (i.e., highest priority) function block sequence is scheduled first at relative time "zero" in the macrocycle. However, other options will be known to those skilled in the art.

3.2.2 A function block sequence that provides an output, or produces a publication, that is received by a previously-assigned function block within the link schedule, is scheduled in reverse order, via reverse order scheduling set forth in 3.2.2.1, from that need. That is, the scheduling should proceed from the end to the beginning of the "to be scheduled" function block sequence with, preferably, minimal delays in accordance with Sections 3.2(C), 3.2(D), and 3.2(E).

Accordingly, provisos 3.2(A) and 3.2(B) operate such that the "to be scheduled" element is retreated appropriately to minimize the delay between the elements in conflict. That is:

3.2.2(A) Since the schedule times of two blocks in a device may not overlap, the "to be scheduled" block is started as soon as possible before this conflict.

3.2.2(B) Since the schedule time of any two publications may not overlap, the publication is scheduled as soon as possible before this conflict.

3.2.2.1 Reverse order scheduling involves first scheduling the start of the execution of the function block, or publication, in the "to be scheduled" sequence as close as possible to the element already in the schedule that requires it. (Accordingly, reverse order scheduling is to a large degree the opposite of forward order scheduling, as described in Section 3.2.3.1.) That is, the end of the execution of the "to be scheduled" function block is scheduled as close as possible to the beginning of the element that requires it. It should thus be evident that this scheduling requires the start of these "to be scheduled" elements be defined such that the time duration of each element is considered.

All of the other blocks and publications that require scheduling in, or associated with, the "to be scheduled" sequence are then scheduled, in reverse order, one at a time. Again, scheduling is performed to minimize delays between the blocks and publications in the "to be scheduled" sequence vis-à-vis Sections 3.2(C), 3.2(D), and 3.2(E), but is subject to Sections 3.2.2(A) and 3.2.2(B) as stated above.

3.2.2.2 If the No-Sample-Skew option is selected, function blocks that have multiple primary inputs should be inspected to see if the execution times of the immediately preceding providing blocks are identical. If not, the later one or ones should be adjusted to coincide with the earliest one, consistent with avoiding conflicts in execution times and publications.

3.2.3 A function block sequence that directly utilizes an output of a previously assigned function block within the link schedule, or directly utilizes a publication, is scheduled in forward order (as set forth in 3.2.3.1.), one at a time, with minimal delay, from that need. Further, the scheduling should proceed from the beginning to end of the "to be scheduled" function block sequence with preferably minimal delays.

Accordingly, provisos 3.2(A) and 3.2(B) operate such that:

3.2.3(A) Since the schedule times of two blocks in a device may not overlap, the "to be scheduled" block is started as soon as possible after this conflict.

3.2.3(B) Since the schedule time of any two publications may not overlap, the publication is scheduled as soon as possible after this conflict.

Thus, 3.2.3(A) and 3.2.3(B) operate such that the "to be scheduled" element is advanced appropriately to minimize the delay between the elements in conflict.

3.2.3.1 Forward order scheduling involves first scheduling the start of the execution of the first function block in the "to be scheduled" sequence as close as possible to the block (or publication) that provides the required output (or publication).

All of the blocks and publications, that require scheduling, in, or associated with, the "to be scheduled" sequence are then scheduled, in forward order, one at a time, with minimal delay, from the element providing the required output or publication. Again, scheduling is performed to minimize delays between the blocks and publications in the "to be scheduled" sequence vis-à-vis Sections 3.2(C), 3.2(D), and 3.2(E), but subject to Sections 3.2.3(A) and 3.2.3(B). Accordingly, conflicts simply require the "next element" be scheduled as close as possible to the element it should follow.

3.2.3.2 If the No-Sample-Skew option is selected, function blocks that have multiple primary inputs should be inspected to see if the execution times of the immediately preceding providing blocks are identical. If not, the later one or ones should be adjusted to coincide with the earliest one, consistent with avoiding conflicts in execution times and publications.

3.2.4 A function block sequence that does not directly utilize an output of a function block that is already assigned to the link schedule (or directly utilize a publication) and does not provide an output connection (or produce a publication) that is received by a previously scheduled function block, is considered independent for latency purposes. Therefore, it is assigned to the link schedule—with minimal delays between any of the sequence's elements—as close to the beginning of the macrocycle as possible.

3.2.4.1 Further, any portion of the "to be scheduled" sequence is preferably adjusted within the macrocycle so as to minimize delay between the elements of the "to be scheduled" sequence. Alternatively, if publications are involved, another—but less-preferable—option compared to minimizing latency would be to arrange the new sequence such that as many of the new publication(s) are placed immediately adjacent to (either before or after) another already-assigned publication. In this way, one or more publication gaps may be eliminated. This should most preferably be performed according to 3.3.

3.2.4.2 If the No-Sample-Skew option is selected, function blocks that have multiple primary inputs should be inspected to see if the execution times of the immediately preceding providing blocks are identical. If not, the later one or ones should be adjusted to coincide with the earliest one, consistent with avoiding conflicts in execution times and publications.

3.3 After the non-back-calculation publication scheduled elements of all function block sequences have been assigned to the schedule (that is, blocks and non-back-calculation publications), each back-calculation publication is scheduled. Each of these may be scheduled to occur at any time after its availability and before its usage (usually within the next execution cycle). Publication gaps meeting this criterion are qualifying publication gaps.

The optimization objective is to arrange, if possible, for the back-calculation publication to be immediately adjacent to (either before or after) another already-assigned publication (that is, of either sort) so as to minimize a "potential publication gap" (as defined in the context of Section 3.3).

If any one qualifying publication gap exists where the to-be-scheduled publication fits exactly, the publication should be placed in any one of the perfectly-fitting gaps. This way, "a potential publication gap" is minimized; actually, it is minimized completely via elimination.

If one qualifying publication gap is available and it is not a "perfect fit", the publication should preferably be placed adjacent to another previously-scheduled publication so as to minimize (i.e., eliminate completely) one of the two "potential publication gaps" inherent in this situation. If the publication cannot be placed adjacent to a previously-scheduled publication, it should be placed so that the larger of the two "potential publication gaps" is maximized. That is, if publication adjacency not possible, it is better to position it such that the two "potential publication gaps" created by its presence are as different in size as possible (i.e., one large and one small).

Likewise, if more than one qualifying publication gap is available and none are perfect fits, the back-calculation publication should be placed in the smallest publication gap to leave the larger publication gap unbroken for longer messages. Further, as above, the larger of the two "potential publication gaps" inherent in the smaller "not perfectly sized publication gap" is maximized. The underlying rationale is that a large "potential publication gap" has a greater potential of usage than two smaller ones since unscheduled messages vary in length, and longer messages can block other messages that are waiting in a queue to be transmitted over the network.

Finally, while it is preferable that the methodology include both steps 3.2 and 3.3, the scheduling of back-publications according to step 3.3 can be performed in conjunction with other scheduling algorithms.

3.4 After all schedule elements have been assigned, find the schedule element that is earliest in time (which may be negative), and adjust it to have an offset within the macrocycle of zero and adjust all other elements by the same amount so as to retain the same relative positions within the schedule. Moreover, as not all schedules may be short enough in time duration to fit within a given macrocycle period validity checks should ideally be made and errors presented to the user.

EXAMPLES OF THE PREFERRED EMBODIMENTS

The examples that follow illustrate the application of this methodology and serve to highlight the benefits.

4.0 Example 1

Two Simple Loops, Control in Actuator

Figure 1:
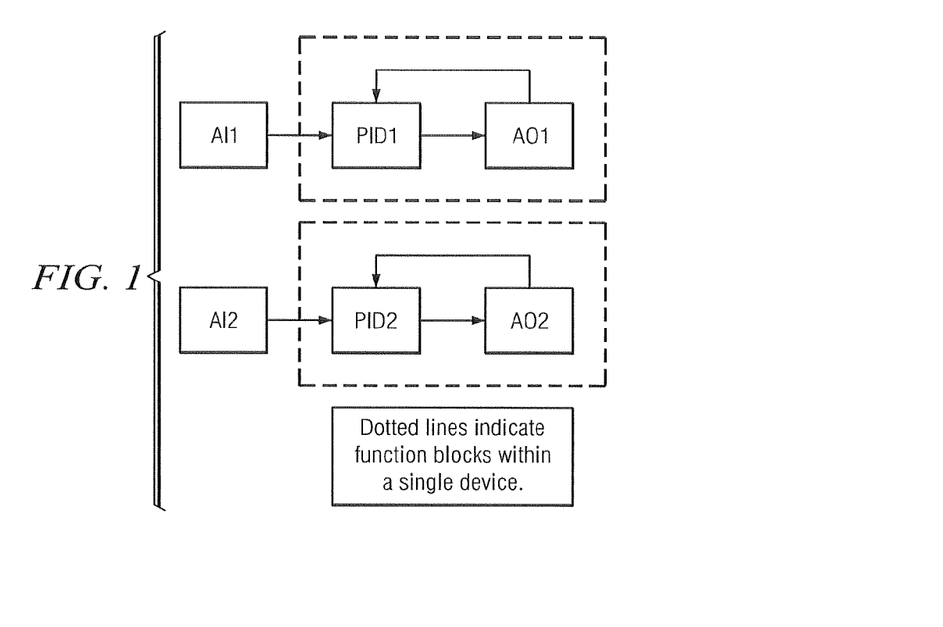
FIG. 1 is a block diagram associated with Example 1.

As shown in FIG. 1, when simple loop control is co-resident with the actuator, there is only one publication from the transmitter to the actuator for each loop.

4.1 Natural Link Schedule

Figure 2:
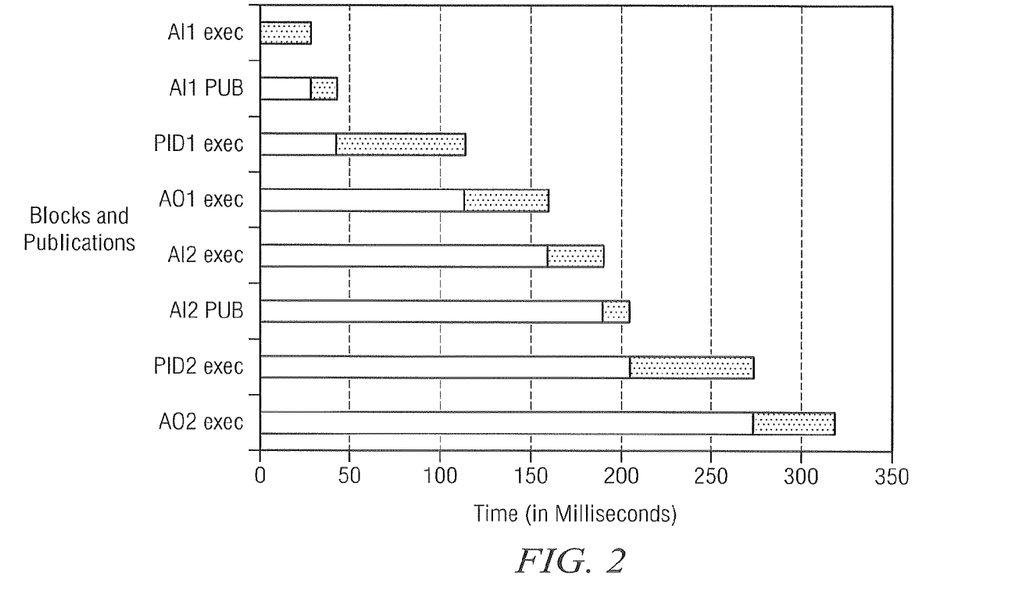
FIG. 2 is a timing diagram associated with the natural schedule of Example 1.

The natural link schedule set forth below, and reflected in FIG. 2, indicates that the blocks of the first loop are executed first, in natural sequence. The second loop sequences identically, but does not start until the first loop completes its execution in its entirety. (The time offsets are in milliseconds.)

| | Schedule | | | | |
|---|---|---|---|---|---|
| Function | Start | Length | End | Pub Gap | Usable Gap |
| AI1 exec | 0 | 30 | 30 | | |
| AI1 PUB | 30 | 14 | 44 | 827 | 812 |
| PID1 exec | 44 | 70 | 114 | | |
| AO1 exec | 114 | 45 | 159 | | |
| AI2 exec | 159 | 30 | 189 | | |
| AI2 PUB | 189 | 14 | 203 | 145 | 130 |
| PID2 exec | 203 | 70 | 273 | | |
| AO2 exec | 273 | 45 | 318 | | |
| | | | | 972 | 942 |

4.2 Optimized Link Schedule

Figure 3:
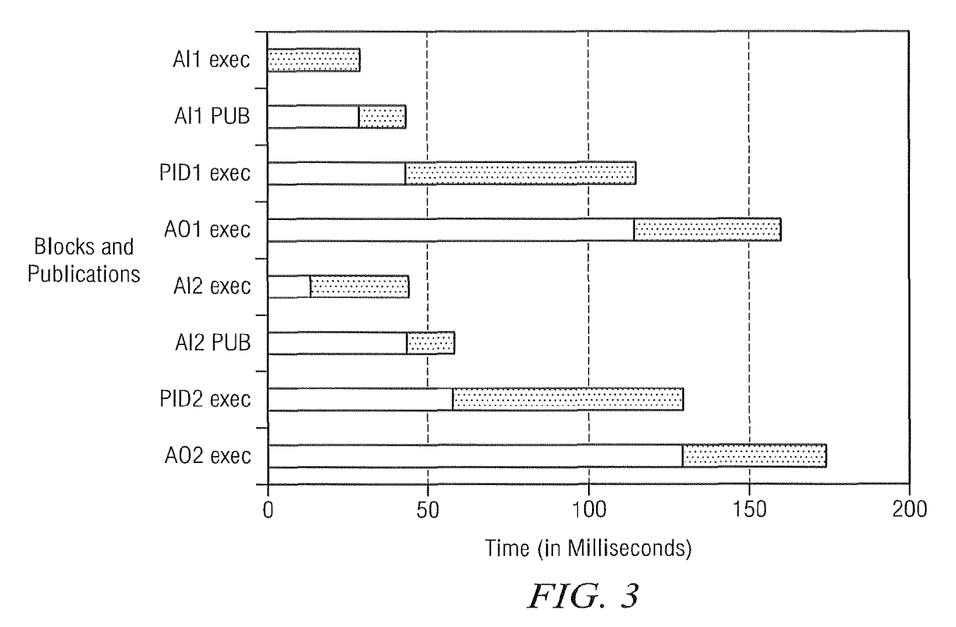
FIG. 3 is a timing diagram associated with the optimized schedule of Example 1.

The optimized link schedule is set forth below and is reflected in FIG. 3. Under the assumption that the first sequence is assigned to the schedule before the second sequence, the second sequence is assigned via 3.2.4 to the link at the beginning of the macrocycle. It then is adjusted via 3.2.4.1 to minimize the delay between the elements. In this way, and as reflected below and in FIG. 3, the entire scheduled portion of the macrocycle is shortened significantly. (The time offsets are in milliseconds.)

| | Schedule | | | | |
|---|---|---|---|---|---|
| Function | Start | Length | End | Pub Gap | Usable Gap |
| AI1 exec | 0 | 30 | 30 | | |
| AI1 PUB | 30 | 14 | 44 | 972 | 957 |
| PID1 exec | 44 | 70 | 114 | | |
| AO1 exec | 114 | 45 | 159 | | |
| AI2 exec | 14 | 30 | 44 | | |
| AI2 PUB | 44 | 14 | 58 | 0 | 0 |
| PID2 exec | 58 | 70 | 128 | | |
| AO2 exec | 128 | 45 | 173 | | |
| | | | | 972 | 957 |

4.3 Ratios of Improvement

Since the two publications are placed adjacent to one another, there is a slight improvement in the publication factor. Most dramatic, however, is the 46% improvement in macrocycle utilization.

| | |
|---|---|
| Latency Factor: | 100% |
| Latency Improvement: | 0% |
| Publication gap Factor: | 98% |
| Publication Improvement: | 2% |
| Macrocycle Utilization Factor: | 54% |
| Macrocycle Utilization Improvement: | 46% |

5.0 Example 2

Two Simple Loops, Control in Transmitter

Figure 4:
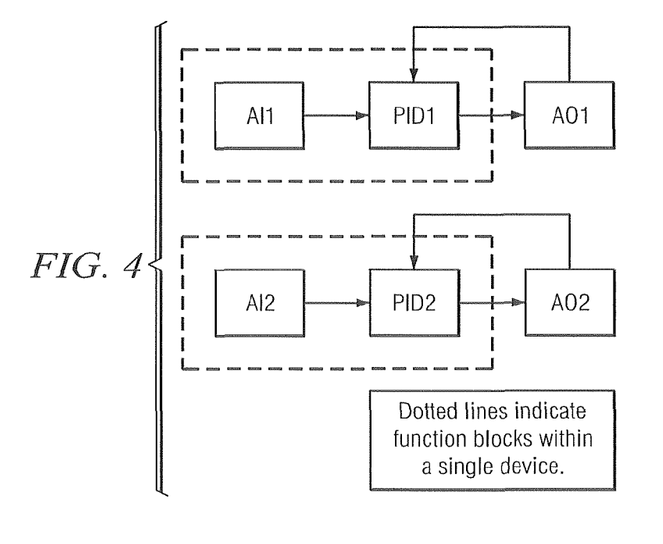
FIG. 4 is a block diagram associated with Example 2.

Although the functionality is identical to the previous example (two simple control loops), the link scheduling differs. When simple loop control is co-resident with the transmitter, there are two publications: one, the output from the controller to the actuator, and a second, the back-calculation parameter from the actuator back to the controller. As indicated in FIG. 4, these occur for each of the two loops.

5.1 Natural Link Schedule

Figure 5:
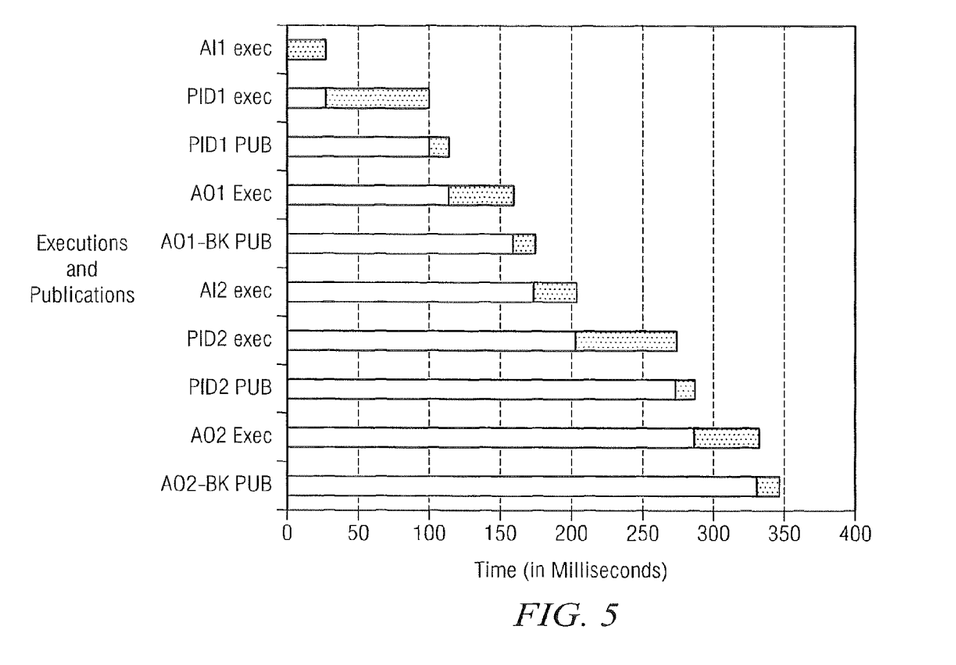
FIG. 5 is a timing diagram associated with the natural schedule of Example 2.

As indicated below, and as reflected in FIG. 5, the natural link schedule executes the blocks of the first loop first with the publication of the PID1's output done as soon as the value is calculated, and the back-calculation of the actuator published as soon as it is available. The second loop sequences identically, but does not start until the first loop completes its execution in its entirety, including the back-calculation.

| | Schedule | | | | |
|---|---|---|---|---|---|
| Function | Start | Length | End | Pub Gap | Usable Gap |
| AI1 exec | 0 | 30 | 30 | | |
| PID1 exec | 30 | 70 | 100 | | |
| PID1 PUB | 100 | 14 | 114 | 754 | 739 |
| AO1 Exec | 114 | 45 | 159 | | |
| AO1-BK PUB | 159 | 14 | 173 | 45 | 30 |
| AI2 exec | 173 | 30 | 203 | | |
| PID2 exec | 203 | 70 | 273 | | |
| PID2 PUB | 273 | 14 | 287 | 100 | 85 |
| AO2 Exec | 287 | 45 | 332 | | |
| AO2-BK PUB | 332 | 14 | 346 | 45 | 30 |
| | | | | 944 | 884 |

5.2 Optimized Link Schedule

Under the assumption that the first sequence is assigned to the schedule before the second sequence, the second sequence is assigned via 3.2.4 to the link at the beginning of the macrocycle. It then is adjusted via 3.2.4.1 to minimize the delay between the elements. Therefore, as shown below and reflected in FIG. 6, the entire scheduled portion of the macrocycle is shortened significantly, permitting more to be done within it.

Figure 6:
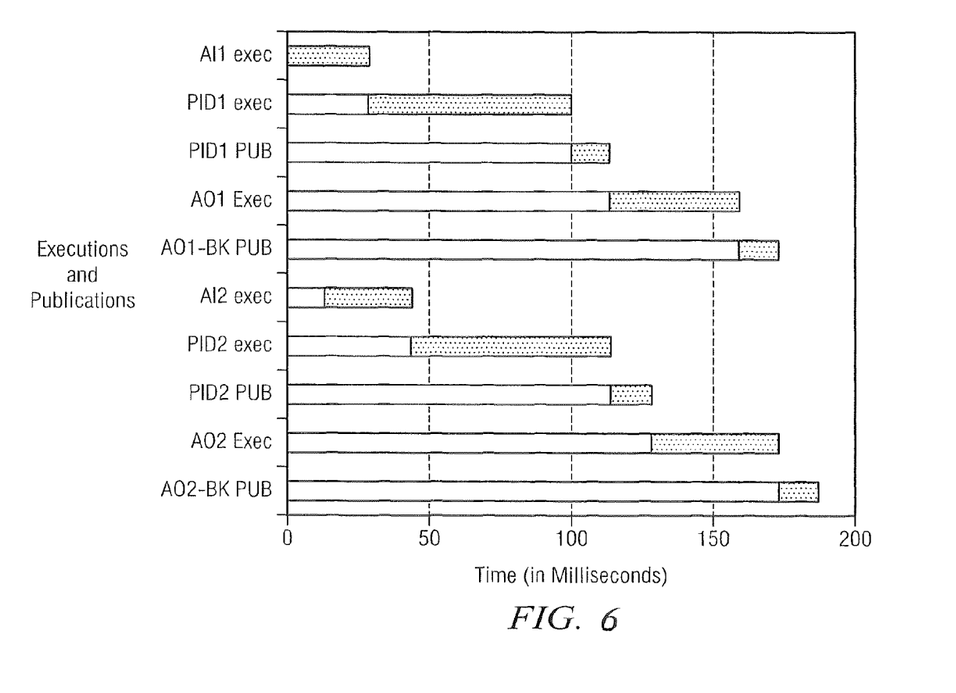
FIG. 6 is a timing diagram associated with the optimized schedule of Example 2.

The back-calculation publications are adjacent to one another. Accordingly, the original publication gap that they severed cannot be made any more unequal given that the back-calculation publications cannot be issued earlier than the completion of their respective PID function block executions; and issuing them just before their respective requiring PID function block executions in the next cycle would form less unequal publication gaps.

| Schedule | | | | | |
|---|---|---|---|---|---|
| Function | Start | Length | End | Pub Gap | Usable Gap |
| AI1 exec | 0 | 30 | 30 | | |
| PID1 exec | 30 | 70 | 100 | | |
| PID1 PUB | 100 | 14 | 114 | 913 | 898 |
| AO1 Exec | 114 | 45 | 159 | | |
| AO1-BK PUB | 159 | 14 | 173 | 31 | 16 |
| AI2 exec | 14 | 30 | 44 | | |
| PID2 exec | 44 | 70 | 114 | | |
| PID2 PUB | 114 | 14 | 128 | 0 | 0 |
| AO2 Exec | 128 | 45 | 173 | | |
| AO2-BK PUB | 173 | 14 | 187 | 0 | 0 |
| | | | | 944 | 914 |

5.3 Ratios of Improvement

Since neither loop has removable latency, no latency improvement is attained. However, because the two publications are placed adjacent to one another, there is a slight improvement in the publication factor. Most dramatic, however, is the 46% improvement in macrocycle utilization.

| | |
|---|---|
| Latency Factor: | 100% |
| Latency Improvement: | 0% |
| Publication gap Factor: | 98% |
| Publication Improvement: | 2% |
| Macrocycle Utilization Factor: | 54% |
| Macrocycle Utilization Improvement: | 46% |

6.0 Example 3

Triple Signal Selector

Figure 7:
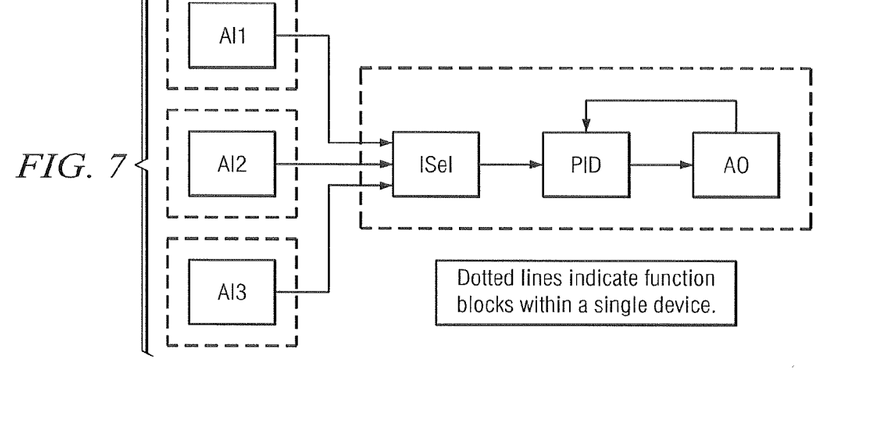
FIG. 7 is a block diagram associated with Example 3.

When triple redundant inputs are used, an input-selector block chooses one—or the average of some or all of the inputs-depending on the goals of the configuration. FIG. 7 sets forth an example using a triple signal selector.

6.1 Natural Link Schedule

Figure 8:
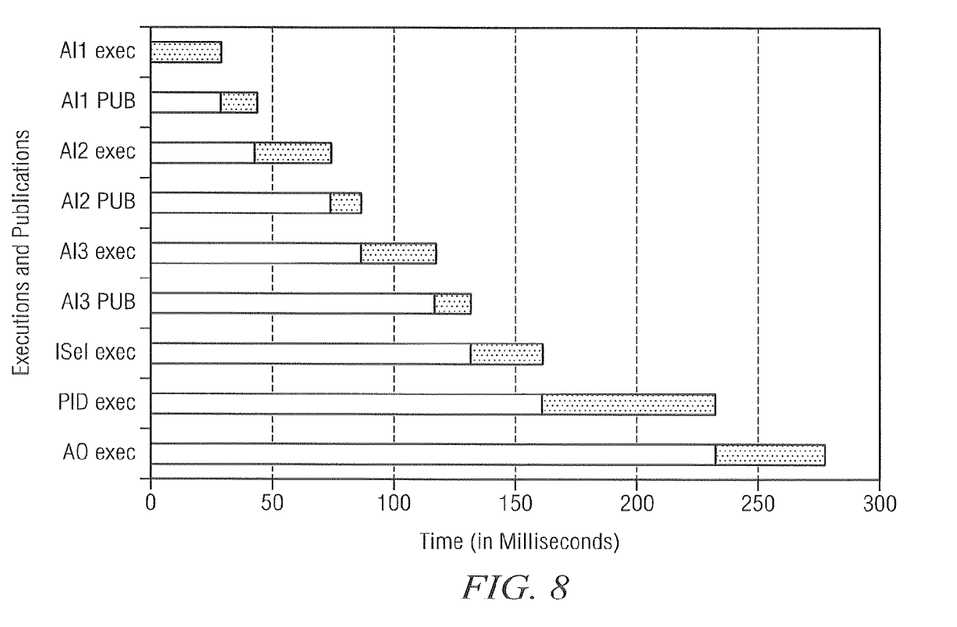
FIG. 8 is a timing diagram associated with the natural schedule of Example 3.

As shown below, and as reflected in FIG. 8, the natural link schedule executes the first AI block that immediately publishes its output. Then, the second AI block is executed, publishing its output immediately. Next, the third AI block is executed, publishing its output immediately. Finally, the Input-Selector block executes, followed by the PID and AO blocks.

| Schedule | | | | | |
|---|---|---|---|---|---|
| Function | Start | Length | End | Pub Gap | Usable Gap |
| AI1 exec | 0 | 30 | 30 | | |
| AI1 PUB | 30 | 14 | 44 | 898 | 883 |
| AI2 exec | 44 | 30 | 74 | | |
| AI2 PUB | 74 | 14 | 88 | 30 | 0 |
| AI3 exec | 88 | 30 | 118 | | |
| AI3 PUB | 118 | 14 | 132 | 30 | 0 |
| ISel exec | 132 | 30 | 162 | | |
| PID exec | 162 | 70 | 232 | | |
| AO exec | 232 | 45 | 277 | | |
| | | | | 958 | 883 |

6.2 Optimized Link Schedule

To minimize skew, "No-Sample-Skew" can be selected and all three values can be simultaneously sampled in the three independent devices. Hence, as shown below and as reflected in FIG. 9, all three AI blocks execute at the same phase of 0 ms. Then, the ISel, PID, and AO execute in sequence. Accordingly, blocks utilizing the data do not encounter differing latencies from the various inputs and macrocycle utilization is improved significantly.

Figure 9:
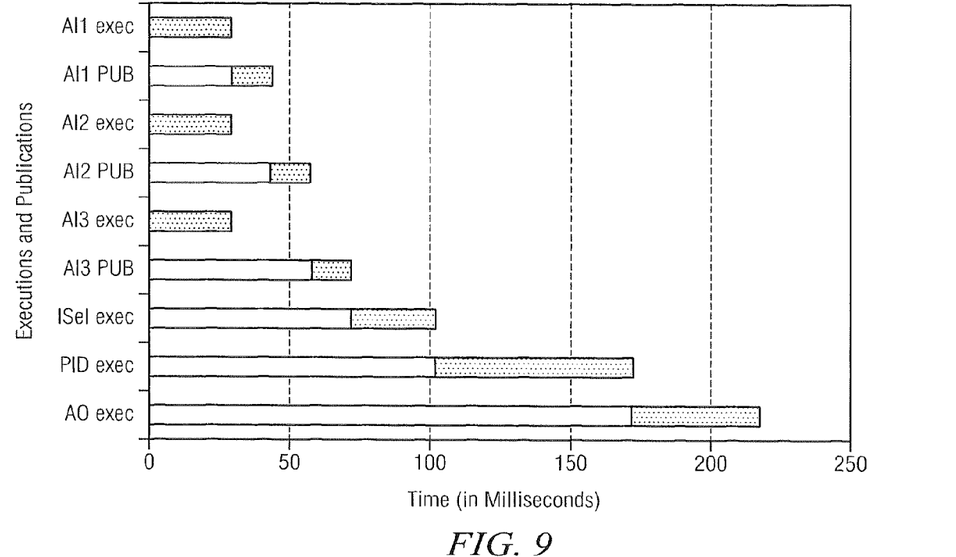
FIG. 9 is a timing diagram associated with the optimized schedule of Example 3.

If on the other hand, No-Sample-Skew been set to OFF, AI1, AI2, and AI3 would start to execute at 0, 14, and 28 ms respectively, and their respective publications would be remain scheduled in sequence immediately after each AI had finished executing, i.e., at 30, 44, and 58 ms. Nevertheless, whether or not the AI block executions are simultaneous or skewed, they always must be published individually, in order of priority.

| Schedule | | | | | |
|---|---|---|---|---|---|
| Function | Start | Length | End | Pub Gap | Usable Gap |
| AI1 exec | 0 | 30 | 30 | | |
| AI1 PUB | 30 | 14 | 44 | 958 | 943 |
| AI2 exec | 0 | 30 | 30 | | |
| AI2 PUB | 44 | 14 | 58 | 0 | 0 |
| AI3 exec | 0 | 30 | 30 | | |
| AI3 PUB | 58 | 14 | 72 | 0 | 0 |
| ISel Exec | 72 | 30 | 102 | | |
| PID Exec | 102 | 70 | 172 | | |
| AO Exec | 172 | 45 | 217 | | |
| | | | | 958 | 913 |

6.3 Ratios of Improvement

By executing all AIs in parallel, the latency and macrocycle utilization factors improved by 22%. By publishing all three publications adjacent to one another, the two small gaps were removed, improving the availability of the link bandwidth for other uses.

| | |
|---|---|
| Latency factor: | 78% |
| Latency Improvement: | 22% |
| Publication gap factor: | 94% |
| Publication Improvement: | 6% |
| Macrocycle Utilization Factor: | 78% |
| Macrocycle Improvement: | 22% |

7.0 Example 4

Triple Cascade

Figure 10:
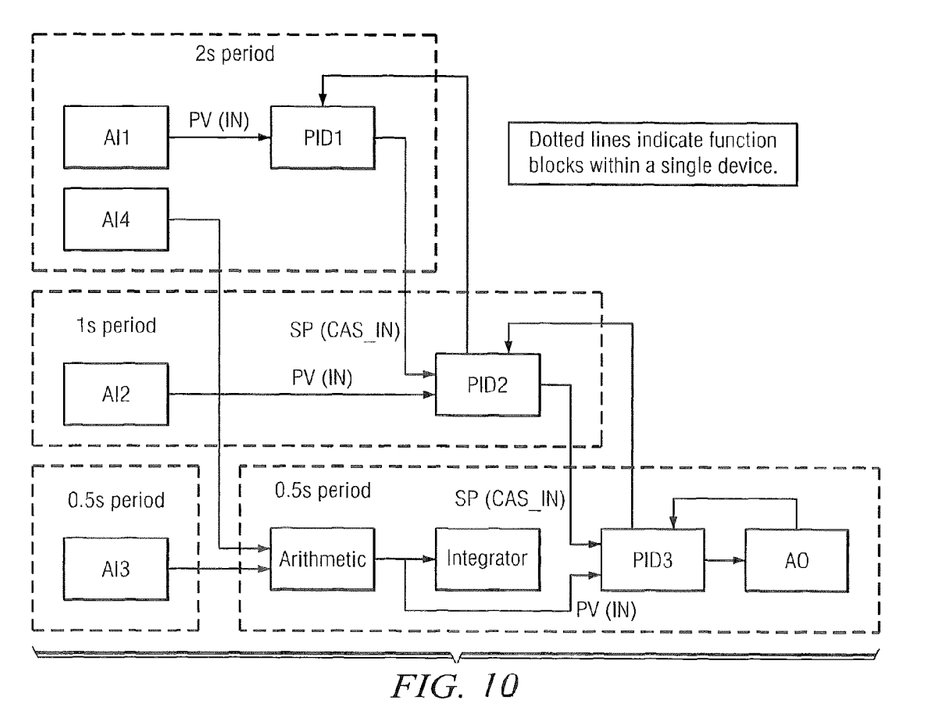
FIG. 10 is a block diagram associated with Example 4.

In a cascade application, the outermost AI function blocks typically sample the slowest moving process variables (such as temperature) and the inner-most AI function blocks typically sample the fastest moving process variables (such as pressure or flow). FIG. 10 sets forth an example of a typical application.

7.1 Natural Link Schedule

Figure 11:
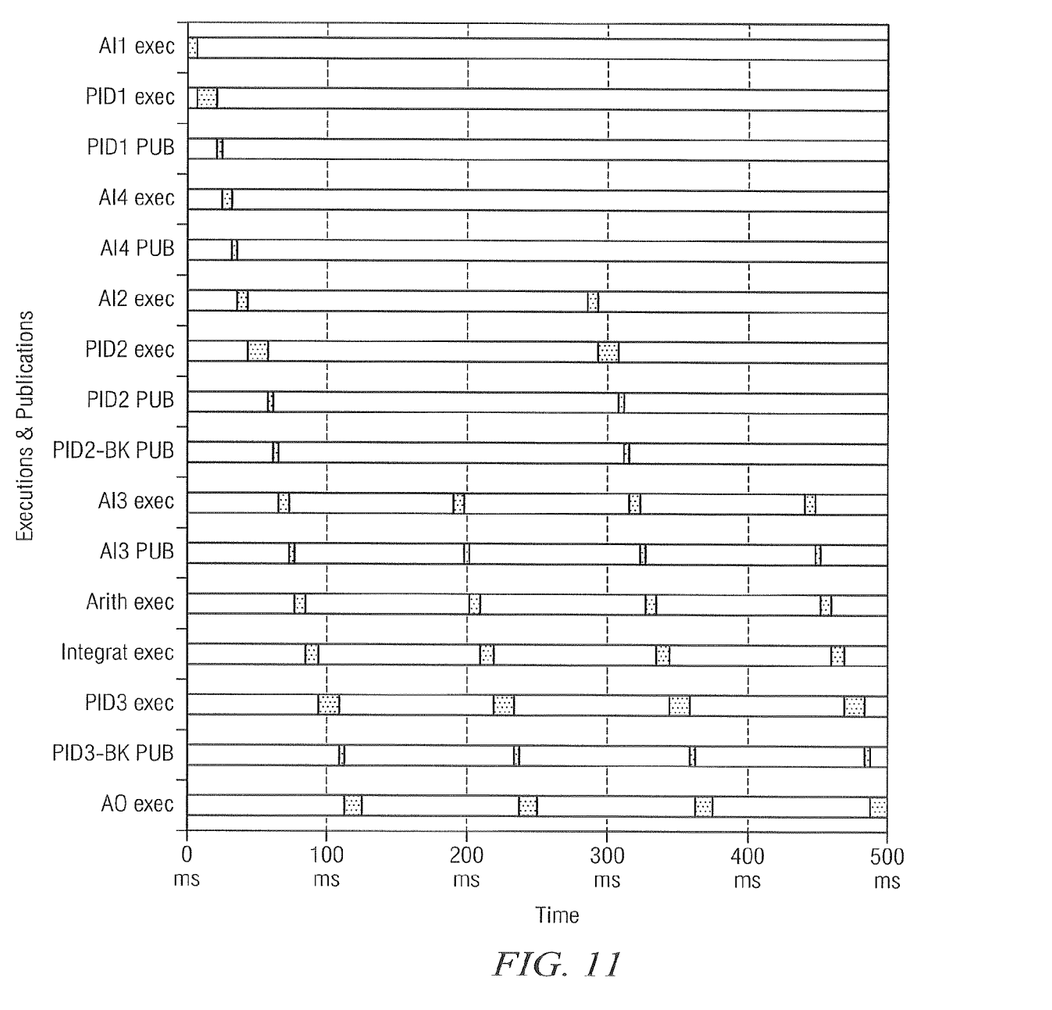
FIG. 11 is a timing diagram associated with the natural schedule of Example 4.

As shown below and reflected in FIG. 11, the natural link schedule executes the first AI function block and its controller and then follows the path of connections within each device, beginning with AI function block, towards the AO function block. It also includes the execution of the integrator function block in its natural diagrammatic location.

| | | Schedule | | | |
|---|---|---|---|---|---|
| Function | Start | Length | End | Pub Gap | Usable Gap |
| AI1 exec | 0 | 30 | 30 | | |
| PID1 exec | 30 | 60 | 90 | | |
| PID1 PUB | 90 | 14 | 104 | 136 | 121 |
| AI4 exec | 104 | 30 | 134 | | |
| AI4 PUB | 134 | 14 | 148 | 30 | 0 |
| AI2 exec | 148 | 30 | 178 | | |
| PID2 exec | 178 | 60 | 238 | | |
| PID2 PUB | 238 | 14 | 252 | 90 | 75 |
| PID2-BK PUB | 252 | 14 | 266 | 0 | 0 |
| AI3 exec | 266 | 30 | 296 | | |
| AI3 PUB | 296 | 14 | 310 | 30 | 0 |
| Arith exec | 310 | 35 | 345 | | |
| Integrator exec | 345 | 35 | 380 | | |
| PID3 exec | 380 | 60 | 440 | | |
| PID3-BK PUB | 440 | 14 | 454 | 130 | 115 |
| AO exec | 454 | 45 | 499 | | |
| | | | | 416 | 311 |

7.2 Optimized Link Schedule

The sequence chart below sets forth and prioritizes the sequences in Example 4.

| | | Sequence Chart: Including Type and Period Based on FIG. 10 | | | | |
|---|---|---|---|---|---|---|
| Seq ID | Block Sequence | Type† | Slowest period | Fastest period | Period Consistency | Priority |
| 1 | AI3-Arith-PID3-AO | Control Loop | 0.5 s | 0.5 s | Homogeneous | 1 |
| 2 | AI3-Arith-Integrator | Monitoring | 0.5 s | 0.5 s | Homogeneous | 5 |
| 3 | AI4-Arith-PID3-AO | Control Loop | 2 s | 0.5 s | Heterogeneous | 3 |
| 4 | AI4-Arith-Integrator | Monitoring | 2 s | 0.5 s | Heterogeneous | 5 |
| 5 | AI2-PID2 | Cascade Loop | 1 s | 1 s | Homogeneous | 2 |
| 6 | AI1-PID1 | Cascade Loop | 2 s | 2 s | Homogeneous | 4 |

Figure 12:
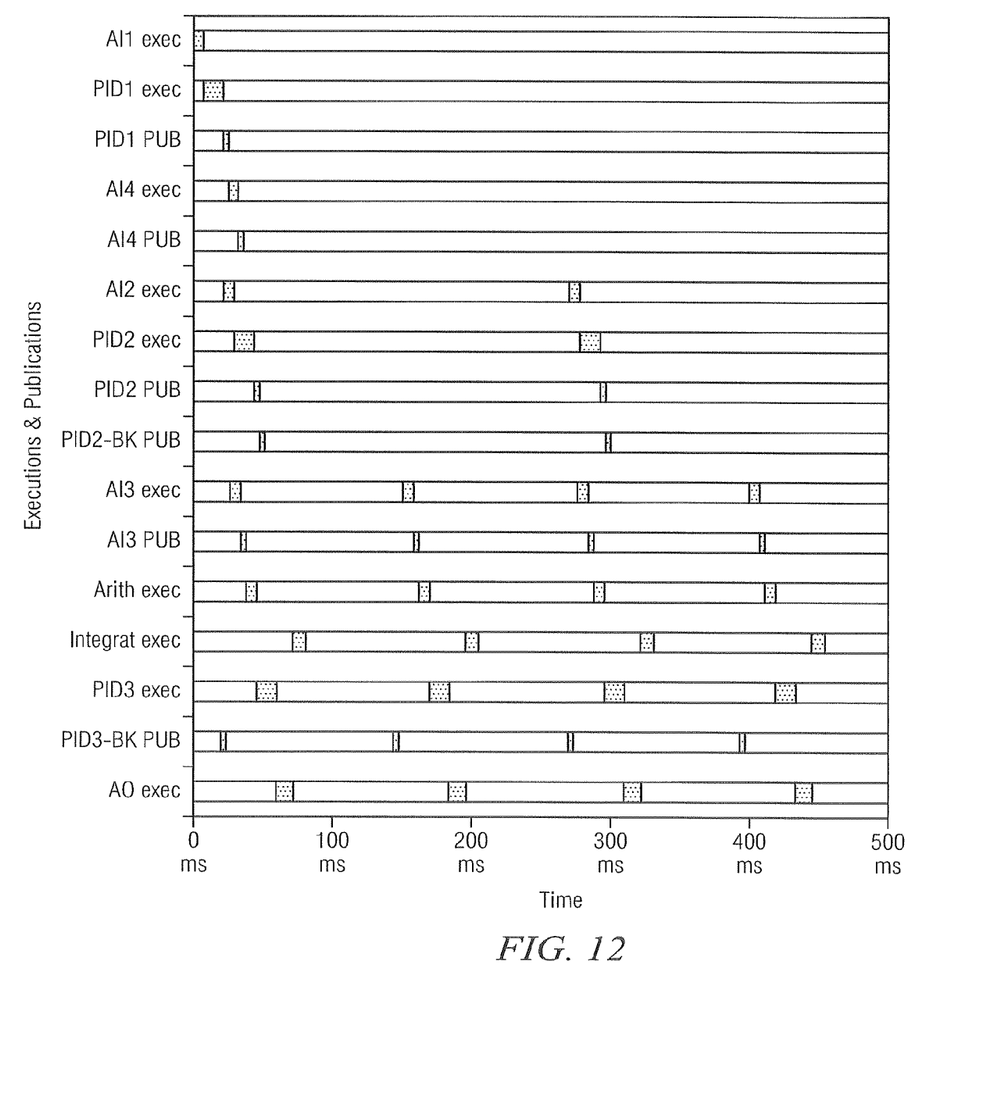
FIG. 12 is a timing diagram associated with the optimized schedule of Example 4.

†Sequences of input-to-output blocks are control loop sequences
Sequences of input-to-control blocks are cascade loop sequences
Sequences of input alone or input-to-other blocks are monitoring sequences The optimized link schedule is created using the sequence chart above and the steps described below. The optimized link schedule set forth below, and reflected in FIG. 12, is created as follows:

A. Sequence ID #1 is scheduled first since it is the highest priority unscheduled sequence. It is the highest priority in light of its speed (0.5 seconds) and its type (control).
 1. AI3 exec
 2. AI13 PUB
 3. Arith exec
 4. PID3 exec
 5. AO exec B. The loop with the next highest priority and its associated publications, ID #5, is then "pulled into" the existing schedule relative to the input needs of PID3, avoiding any potential conflicts with executions and publications. Sequence ID #5 was chosen as the second sequence since it possessed the "smallest" (fastest) period of the remaining non-monitoring type sequences (i.e., sequences 3, 5, and 6) and is a "cascade" sequence. The output of the sequence's blocks (AI2-PID2) is needed by PID3 exec, just prior to execution, so PID2 PUB is scheduled in reverse order from that need.
 6. PID2 PUB
 7. PID2 exec
 8. AI2 exec C. Sequences ID #3 and #6 are both involved in control and unassigned portions execute at a 2-second period. Sequence ID #3 takes precedence, however, since it is a control sequence and ID #6 is a cascade sequence. Since the output of the sequence is used by the Arithmetic block, it is scheduled in reverse from that need. However, since AI3 publishes its output immediately prior to the execution of the Arithmetic block, AI4's publication is retreated so that it completes just prior to the start of AI3's publication.
 9. AI4 PUB
 10. AI4 exec D. The only remaining sequence involved in control is identified to be sequence #6. This cascade sequence ends with PID1's publication, which is needed by the previously scheduled PID2 block. Hence, PID1 PUB is scheduled to complete immediately before the execution of PID2. Further, PID1 is scheduled so as to complete just before the publication is scheduled; and the AI1 block is scheduled to execute completely just before the PID1 block executes.
 11. PID1 PUB
 12. PID1 exec
 13. AI1 exec E. At this point, there are no remaining sequences involved in control with unscheduled blocks. Thus, the monitoring sequences with unscheduled blocks are next scheduled (i.e., sequences #2 and #4). Since AI3, AI4, and the Arithmetic block have already been scheduled, the Integrator block is the only remaining unscheduled block in both of these sequences. Accordingly, either may be selected for scheduling next.

Since the Integrator's input is dependent on the execution of the Arithmetic block, it is scheduled to execute as soon as possible after the Arithmetic block has completed execution. However, since the Integrator resides in the same single-application processor as PID3 and AO, which have been previously scheduled in accordance with their higher priority, the Integrator cannot be scheduled until immediately after the AO completes its execution.
 12. Integrator exec F. Finally, back-calculation publications are scheduled within their "available"-to-"needed" time range so that they are placed adjacent to other publications in accordance with 3.3. PID3 is the innermost of the cascaded control blocks so it is higher priority, with PID2 next. (PID1 need not publish its back-calculation output because there are no blocks that require it.)

More specifically, PID3 BK is available for publication when PID3 completes its execution and its publication must be completed by the time PID2 starts its execution. Accordingly, it can be scheduled after PID3 completes until the end of the macrocycle or from the start of the macrocycle up to the time that PID2 starts execution (less its publication duration time). There is only one other publication already scheduled within those bounds, and that is PID1's publication. Since it cannot be published after that (i.e., it is too late), it is scheduled just prior to PID1 PUB. Accordingly, this adjacency eliminates a "potential publication gap" in accordance with Section 3.3.

PID2 BK is available for publication when PID2 completes its execution and its publication must be completed by the time PID1, its user, starts its execution. It can be scheduled from PID2's completion until the end of the macrocycle, or between the start of the macrocycle and the time that PID1 starts its execution (less the publication duration time). There is only one other publication already scheduled within those bounds, and that is PID2's publication. Since it cannot be published before PID2's publication (i.e., it is not ready yet), it is scheduled just after PID2's publication in order to eliminate a "potential publication gap" in accordance with Section 3.3.

13. PID3 BK PUB
14. PID2 BK PUB

Accordingly, the Optimized Link Schedule is as follows:

Schedule

| Function | Start | Length | End | Pub Gap | Usable Gap |
|---|---|---|---|---|---|
| AI1 exec | 0 | 30 | 30 | | |
| PID1 exec | 30 | 60 | 90 | | |
| PID1 PUB | 90 | 14 | 104 | 0 | 0 |
| AI4 exec | 85 | 30 | 115 | | |
| AI4 PUB | 115 | 14 | 129 | 11 | 0 |
| AI2 exec | 74 | 30 | 104 | | |
| PID2 exec | 104 | 60 | 164 | | |
| PID2 PUB | 164 | 14 | 178 | 21 | 0 |
| PID2-BK PUB | 178 | 14 | 192 | 0 | 0 |
| AI3 exec | 99 | 30 | 129 | | |
| AI3 PUB | 129 | 14 | 143 | 0 | 0 |
| Arith exec | 143 | 35 | 178 | | |
| Integrator exec | 283 | 35 | 318 | | |
| PID3 exec | 178 | 60 | 238 | | |
| PID3-BK PUB | 76 | 14 | 90 | 384 | 369 |
| AO exec | 238 | 45 | 283 | | |
| | | | | 416 | 369 |

7.3 Ratios of Improvement

By utilizing parallel executions and moving the executions of the integrator and PID3-BKPUB until after the execution of the final control element, the latency of the most critical loop improved by 21% and the macrocycle utilization factor improved by 43%. By executing publications adjacent to one another, there was a publication improvement of 4%.

| | |
|---|---|
| Latency factor: | 79% |
| Latency Improvement: | 21% |
| Publication gap factor: | 96% |
| Publication Improvement: | 4% |
| Macrocycle Utilization Factor: | 57% |
| Macrocycle Improvement: | 43% |

The present invention has been described herein primarily as a method for optimising a Foundation FIELDBUS link schedule. However, it will be appreciated by those skilled in the art that the invention is not limited to this particular field of use and can be applicable and used to advantage in any communication network that operates on a periodically-executed schedule.

It, therefore, will be obvious to those skilled in the art that various changes and modifications can be made therein without departing from the spirit and scope of the invention as defined in the appended claims.

What is claimed is:

1. A method comprising:
    identifying a plurality of function blocks requiring execution;
    identifying the function blocks as members of multiple groups;
    prioritizing the groups such that each group has a priority;
    scheduling the groups containing at least one unscheduled function block for communication on a network to produce a schedule, the groups scheduled in an order based on the priority of the groups; and
    initiating execution of the function blocks by one or more processor devices based on the schedule;
    wherein identifying the function blocks as members of multiple groups comprises:
        following one or more connections in a series of connected function blocks;
        adding each unique function block in the series to a first of the groups; and
        preventing function blocks in the series that have already been added to the first group from being added to the first group again.

2. The method of claim 1, wherein, if more than one primary connection out of one of the function blocks exists, a group is identified for each of the primary connections.

3. The method of claim 1, wherein prioritizing the groups comprises:
    assigning one or more first priorities to one or more groups associated with monitoring an industrial process; and
    assigning one or more second priorities to one or more groups associated with controlling the industrial process, the one or more second priorities higher than the one or more first priorities.

4. The method of claim 3, wherein assigning the one or more second priorities comprises:
    assigning a higher second priority to a group having a longer execution and publication time and a lower second priority to a group having a shorter execution and publication time.

5. The method of claim 1, wherein scheduling the groups comprises:
    adding non-back-calculation publications associated with the function blocks to the schedule, wherein any non-back-calculation publications associated with one of the groups are added to the schedule before any non-back-calculation publications associated with lower priority groups are added.

6. The method of claim 5, wherein scheduling the groups further comprises:
    adding back-calculation publications associated with the function blocks to the schedule after the non-back-calculation publications have been added to the schedule, wherein each back-calculation publication is one of:
        scheduled immediately adjacent to an already-scheduled publication if possible; and scheduled where a publication gap is maximized if it is not possible to schedule the back-calculation publication immediately adjacent to an already-scheduled publication.

7. The method of claim 6, wherein scheduling the groups further comprises:
   minimizing a delay between (i) a completion of execution of a first function block producing a primary connection output and (ii) an initiation of execution of a second function block directly inputting the primary connection output produced by the first function block;
   minimizing a delay between (i) a completion of execution of a third function block producing a non-back-calculation publication and (ii) the non-back-calculation publication produced by the third function block; and
   minimizing a delay between (i) an initiation of execution of a fourth function block inputting the non-back-calculation publication and (ii) the inputting of the non-back-calculation publication by the fourth function block.

8. The method of claim 6, wherein scheduling the groups further comprises:
   prohibiting execution times of two function blocks associated with a single-application processor device from overlapping; and
   prohibiting execution times of any two publications from at least partially overlapping.

9. A method comprising:
   identifying a plurality of function blocks requiring execution;
   identifying the function blocks as members of multiple groups;
   prioritizing the groups such that each group has a priority;
   scheduling the groups containing at least one unscheduled function block for communication on a network to produce a schedule, the groups scheduled in an order based on the priority of the groups; and
   initiating execution of the function blocks by one or more processor devices based on the schedule;
   wherein scheduling the groups comprises:
      adding non-back-calculation publications associated with the function blocks to the schedule, wherein any non-back-calculation publications associated with one of the groups are added to the schedule before any non-back-calculation publications associated with lower priority groups are added to the schedule; and
      adding back-calculation publications associated with the function blocks to the schedule after the non-back-calculation publications have been added to the schedule.

10. The method of claim 9, wherein each back-calculation publication is one of:
    scheduled immediately adjacent to an already-scheduled publication if possible; and
    scheduled where a publication gap is maximized if it is not possible to schedule the back-calculation publication immediately adjacent to an already-scheduled publication.

11. The method of claim 9, wherein prioritizing the groups comprises prioritizing the groups based on at least one of:
    a group type associated with each group; and
    a period length associated with each group.

12. The method of claim 9, wherein prioritizing the groups comprises:
    assigning one or more first priorities to one or more groups associated with monitoring an industrial process; and
    assigning one or more second priorities to one or more groups associated with controlling the industrial process, the one or more second priorities higher than the one or more first priorities.

13. The method of claim 12, wherein assigning the second priorities to the groups associated with controlling the industrial process comprises:
    assigning a higher second priority to a group having a longer execution and publication time and a lower second priority to a group having a shorter execution and publication time.

14. A method comprising:
    identifying a plurality of function blocks requiring execution;
    identifying the function blocks as members of multiple groups;
    prioritizing the groups such that each group has a priority;
    scheduling the groups containing at least one unscheduled function block for communication on a network to produce a schedule, the groups scheduled in an order based on the priority of the groups; and
    initiating execution of the function blocks by one or more processor devices based on the schedule;
    wherein scheduling the groups comprises:
       identifying a multi-input function block that has multiple inputs provided by multiple preceding function blocks; and
       scheduling execution of the function blocks so that execution of the multiple preceding function blocks coincide with one another.

15. The method of claim 14, wherein the different devices comprise multiple processors.

16. The method of claim 14, wherein scheduling the groups comprises:
    adding non-back-calculation publications associated with the function blocks to the schedule, wherein any non-back-calculation publications associated with one of the groups are added to the schedule before any non-back-calculation publications associated with lower priority groups are added.

17. The method of claim 16, wherein scheduling the groups further comprises:
    adding back-calculation publications associated with the function blocks to the schedule after the non-back-calculation publications have been added to the schedule, wherein each back-calculation publication is one of:
    scheduled immediately adjacent to an already-scheduled publication if possible; and
    scheduled where a publication gap is maximized if it is not possible to schedule the back-calculation publication immediately adjacent to an already-scheduled publication.

18. The method of claim 17, wherein scheduling the groups further comprises:
    minimizing a delay between (i) a completion of execution of a first function block producing a primary connection output and (ii) an initiation of execution of a second function block directly inputting the primary connection output produced by the first function block;
    minimizing a delay between (i) a completion of execution of a third function block producing a non-back-calculation publication and (ii) the non-back-calculation publication produced by the third function block; and
    minimizing a delay between (i) an initiation of execution of a fourth function block inputting the non-back-calculation publication and (ii) the inputting of the non-back-calculation publication by the fourth function block.

19. The method of claim 17, wherein scheduling the groups further comprises prohibiting execution times of two function blocks associated with a single one of the devices from overlapping.

20. The method of claim 14, wherein the network comprises a fieldbus.

* * * * *